US012577891B2

(12) United States Patent
Oriol et al.

(10) Patent No.: US 12,577,891 B2
(45) Date of Patent: Mar. 17, 2026

(54) AUXILIARY OIL SUPPLY DEVICE FOR AN AIRCRAFT TURBINE ENGINE

(71) Applicant: SAFRAN AIRCRAFT ENGINES, Paris (FR)

(72) Inventors: Sebastien Oriol, Moissy-Cramayel (FR); Mohammed-Lamine Boutaleb, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 78 days.

(21) Appl. No.: 18/695,775

(22) PCT Filed: Sep. 27, 2022

(86) PCT No.: PCT/FR2022/051810
§ 371 (c)(1),
(2) Date: Mar. 26, 2024

(87) PCT Pub. No.: WO2023/052718
PCT Pub. Date: Apr. 6, 2023

(65) Prior Publication Data
US 2024/0384668 A1 Nov. 21, 2024

(30) Foreign Application Priority Data

Sep. 30, 2021 (FR) ...................................... 2110348
Sep. 30, 2021 (FR) ...................................... 2110361

(51) Int. Cl.
*F01D 25/20* (2006.01)
*B64C 11/38* (2006.01)
(Continued)

(52) U.S. Cl.
CPC .............. *F01D 25/20* (2013.01); *B64C 11/38* (2013.01); *F01D 7/00* (2013.01); *F01D 25/18* (2013.01);
(Continued)

(58) Field of Classification Search
CPC . F01D 25/20; F01D 7/00; F01D 25/18; F05D 2260/70; F05D 2260/98; F05D 2270/64; F15B 1/26
See application file for complete search history.

(56) References Cited

U.S. PATENT DOCUMENTS 5,004,407 A * 4/1991 Hutchison ............. F04C 11/001
                                                         418/199
10,501,169 B2 * 12/2019 Waddleton ............ F04D 29/582
(Continued)

FOREIGN PATENT DOCUMENTS

EP          2261539 A2    12/2010

OTHER PUBLICATIONS

International Search Report received for PCT Patent Application No. PCT/FR2022/051810, mailed on Dec. 21, 2022, 5 pages (2 pages of English Translation and 3 pages of Original Document).

*Primary Examiner* — Andrew J Marien
(74) *Attorney, Agent, or Firm* — WOMBLE BOND DICKINSON (US) LLP

(57) ABSTRACT

An auxiliary supply device that includes: an auxiliary oil tank, an auxiliary pump including an inlet connected to the auxiliary tank and an outlet, a valve including a body having an inlet connected to the outlet of the auxiliary pump and a first outlet connected to the auxiliary oil tank, and a second outlet intended to be connected to a control system, the valve further having a member capable of moving within the body and configured to move between a first position in which the inlet of the valve is in fluid communication with the first outlet of the valve and a second position in which the inlet of the valve is in fluid communication with the second outlet of the valve.

12 Claims, 6 Drawing Sheets

(51) Int. Cl.
    F01D 7/00          (2006.01)
    F01D 25/18        (2006.01)
    *F15B 1/26*         (2006.01)

(52) U.S. Cl.
    CPC ...... *F05D 2260/70* (2013.01); *F05D 2260/98*
            (2013.01); *F05D 2270/64* (2013.01); *F15B*
                                *1/26* (2013.01)

(56) References Cited

U.S. PATENT DOCUMENTS

| | | | |
|---|---|---|---|
| 11,530,027 B2 * | 12/2022 | Krzywon | F02C 9/58 |
| 2005/0135929 A1 * | 6/2005 | Waddleton | B64C 11/38 |
| | | | 416/1 |
| 2006/0168956 A1 * | 8/2006 | Sakai | F15B 1/26 |
| | | | 60/473 |
| 2010/0213010 A1 | 8/2010 | Cornet et al. | |
| 2010/0294371 A1 | 11/2010 | Parnin et al. | |
| 2013/0319798 A1 * | 12/2013 | Sheridan | F01D 25/20 |
| | | | 184/6 |
| 2017/0138217 A1 * | 5/2017 | Schwarz | G01N 15/0656 |
| 2018/0073395 A1 * | 3/2018 | Parnin | F16H 57/0442 |
| 2020/0392866 A1 * | 12/2020 | Younes | F16C 19/52 |

* cited by examiner

AUXILIARY OIL SUPPLY DEVICE FOR AN AIRCRAFT TURBINE ENGINE

TECHNICAL FIELD OF THE INVENTION

The invention relates to the field of the auxiliary oil supply devices for an aircraft turbine engine.

TECHNICAL BACKGROUND

The prior art is illustrated by the documents US-A1-2005135929, US-A1-2013319798 and EP-B1-2261539.

A turbine engine for an aircraft comprises, from upstream to downstream, at least one first rotor, also referred as a thruster rotor, such as a propeller when the turbine engine is a turboprop engine, or an unducted fan when the turbine engine is of the "open rotor" type, or a ducted fan when the turbine engine is a turbojet engine, a compressor, a combustion chamber and a turbine. The rotor of the compressor is connected to the rotor of the turbine and to the first rotor by a drive shaft. An air flow is compressed within the compressor, then the compressed air is mixed with a fuel and burnt within the combustion chamber. The gases formed by the combustion pass through the turbine, which allows to drive the rotor of the compressor and the thruster rotor.

The propeller or the fan of the thruster rotor and the rotor of the compressor are equipped with vanes that allow them to exert an action on the air flow. In order to adapt the turbine engine to the flight conditions, it is known to equip the thruster rotor with variable pitch angle vanes or the rotor of the compressor with variable pitch angle vanes. To this end, the turbine engine comprises a variable control system for controlling the variable pitch angle vanes which comprises a control unit connected to a hydraulic actuator to rotate the vanes relative to a longitudinal axis of the vanes according to the orientation of the air flow.

In order to supply oil to the control system and in particular to the hydraulic actuator, as well as to other elements of the turbine engine such as bearings and reducers, the turbine engine typically comprises an oil supply system. This supply system comprises, for example, a main tank connected to a second supply circuit on which a pump is mounted, allowing the suction of oil from the main tank and the circulation of this oil to the hydraulic actuator. The main tank typically comprises an enclosure with a lower and upper wall connected by transverse walls. The lower wall comprises an aperture connected to the pump for the suction of the oil.

Certain phases of aircraft flight disrupt the oil supply to the hydraulic actuator. In fact, the aircraft can experience phases of flight during which the gravitational force is zero or negative. In the context of the invention, these phases of flight are referred to as the "0 g condition" when the gravitational force is zero, or the "negative g condition" when the gravitational force is reversed. During such phases of flight, the oil contained in the main tank is pressed against the upper wall of the tank opposite the aperture in negative g conditions, or the oil and air form a suspension charged with air bubbles in 0 g conditions. As a result, the pump no longer sucks in oil but air or oil with a high air bubble content, which impairs the oil supply to the control system and can even cause the supply pump to stop. In all cases, the hydraulic actuator of the control system is no longer correctly supplied with oil.

Such a deterioration in the oil supply to the control system, and in particular to the hydraulic actuator, can render the pitch setting of the vanes of the thruster rotor uncontrollable, in particular the blades of the propeller or of the unducted fan, which can lead to the vanes being feathered by a safety system. This significantly reduces the thrust of the turbine engine, leading to a loss of control, which is unacceptable.

As a result, there is a need to provide an oil supply device that ensures a supply of oil to the control system for controlling the variable pitch angle vanes during phases of flight when the gravitational force is zero or negative.

SUMMARY OF THE INVENTION

To this end, the invention proposes an auxiliary device for supplying oil to a control system for controlling the variable pitch angle of the vanes for an aircraft turbine engine, the control system being supplied with oil from a main oil tank under conditions of positive gravitational force experienced by the aircraft, the auxiliary device being intended to supply oil to the control system under conditions of negative or zero gravitational force experienced by the aircraft, the auxiliary device comprising:

an auxiliary oil tank,
an auxiliary pump comprising an inlet connected to the auxiliary tank and an outlet,
a valve comprising a body having an inlet connected to the outlet of the auxiliary pump and a first outlet connected to the auxiliary tank, and a second outlet intended to be connected to the control system, the valve further comprising a member movable within the body and configured to move between a first position in which the inlet of the valve is in fluid communication with the first outlet of the valve and a second position in which the inlet of the valve is in fluid communication with the second outlet of the valve.

The device described in this invention therefore allows the control system to be supplied from the auxiliary tank. The auxiliary pump according to the invention is always active. When the movable member of the valve is in the first position, the turbine engine is in a normal operating phase. The valve then allows the oil sucked up by the auxiliary pump to be redirected towards the auxiliary tank. When the turbine engine is in a second operating phase, in particular when the gravitational force is zero (0 g condition) or negative (negative g condition), the movable member moves to the second position. The valve then allows to deliver the oil sucked by the auxiliary pump to the control system.

This ensures that the control system is supplied without interruption. In addition, the continuous activity of the auxiliary pump means that the control system can be supplied without delay when the turbine engine enters the second phase of operation.

The invention may comprise one or more of the following characteristics, taken alone or in combination with each other:

the auxiliary pump is a fixed-displacement hydraulic pump;
the valve comprises a hydraulic actuation chamber;
a rotary motor to drive the auxiliary pump;
a pressure limiter arranged between the auxiliary pump and the valve.
the auxiliary tank is configured to deliver oil in a 0 g and/or negative g condition.

The invention also relates to an aircraft turbine engine, comprising:

variable pitch angle vanes,
a control system for controlling the pitch of the vanes comprising:

a control unit connected to a hydraulic actuator, an oil supply system comprising:

a main oil tank, an oil supply pump comprising an inlet connected to the main oil tank and an outlet connected to the control system.

The turbine engine is characterised in that it also comprises an auxiliary oil supply device according to any of the preceding characteristics.

The turbine engine may comprise one or more of the following characteristics, taken singly or in combination:

the oil supply system comprises:

a second oil supply circuit connecting the main tank to the control system and on which the supply pump is mounted, the valve being mounted on said second supply circuit between the supply pump and the control system, and an oil recovery circuit connecting the control system to the auxiliary tank;

the movable member is configured to move towards the second position when the pressure at the inlet to the supply pump is less than a threshold pressure;

the auxiliary tank comprises an enclosure delimiting a first internal volume of oil and having at least a first outlet port connected to the main tank, a second outlet port connected to the auxiliary pump, a first inlet port connected to the control system, and a second inlet port connected to the valve, the auxiliary tank further comprising a movable retention wall able to equalise the volume of oil to the internal volume when the valve is in the second position;

the movable retention wall is formed by the enclosure and comprises a retractable membrane formed by a wall of the enclosure;

the movable retention wall comprises a plate which can be moved in translation in the enclosure, extending between two side walls of the enclosure.

The invention also relates to a method for supplying oil to an aircraft turbine engine according to any of the above characteristics, comprising the following steps:

(a) during a first operating state of the turbine engine, supplying oil to the control system from the main tank, the valve being in a nominal operating state in which the movable member is in the first position, (b) detecting a second operating state of the turbine engine, (c) actuating the valve to move the movable member from the first position to the second position to supply oil from the auxiliary tank to the control system.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

Figure 1:
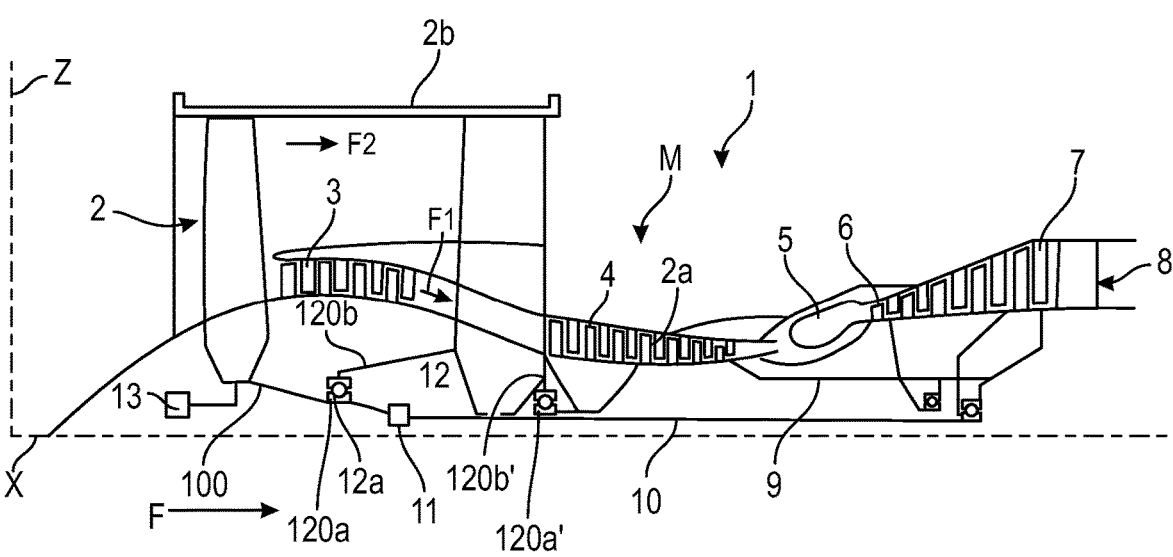
FIG. 1 is a schematic representation in longitudinal cross-section of an aircraft half-turbine engine according to a first embodiment of the invention.
Figure 2:
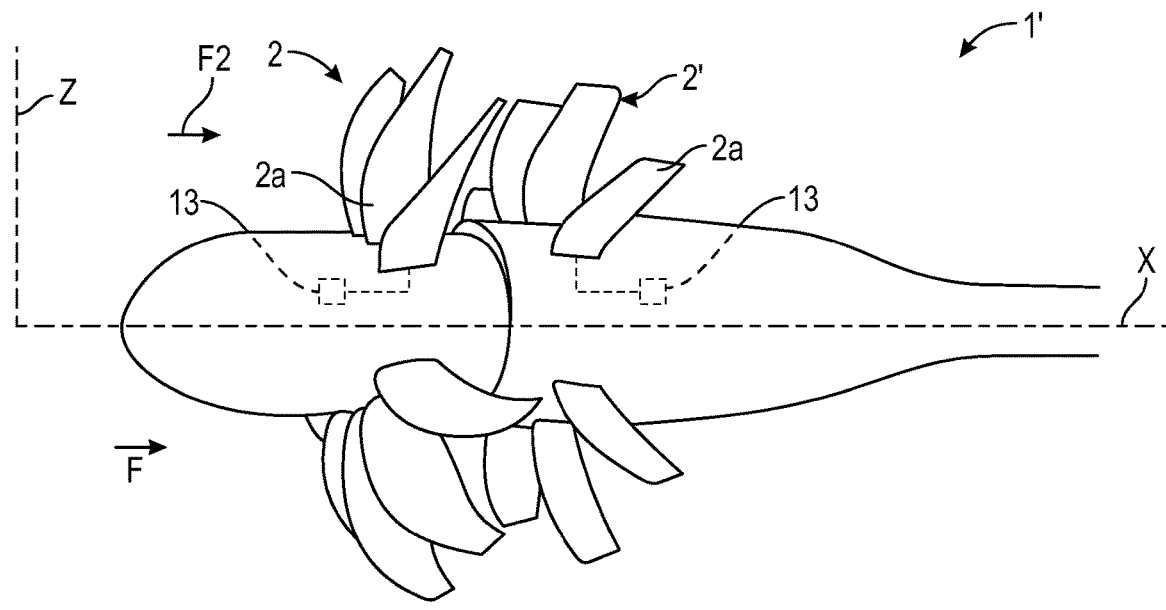
FIG. 2 is a schematic perspective representation of an aircraft turbine engine according to a second embodiment of the invention.
Figure 3:
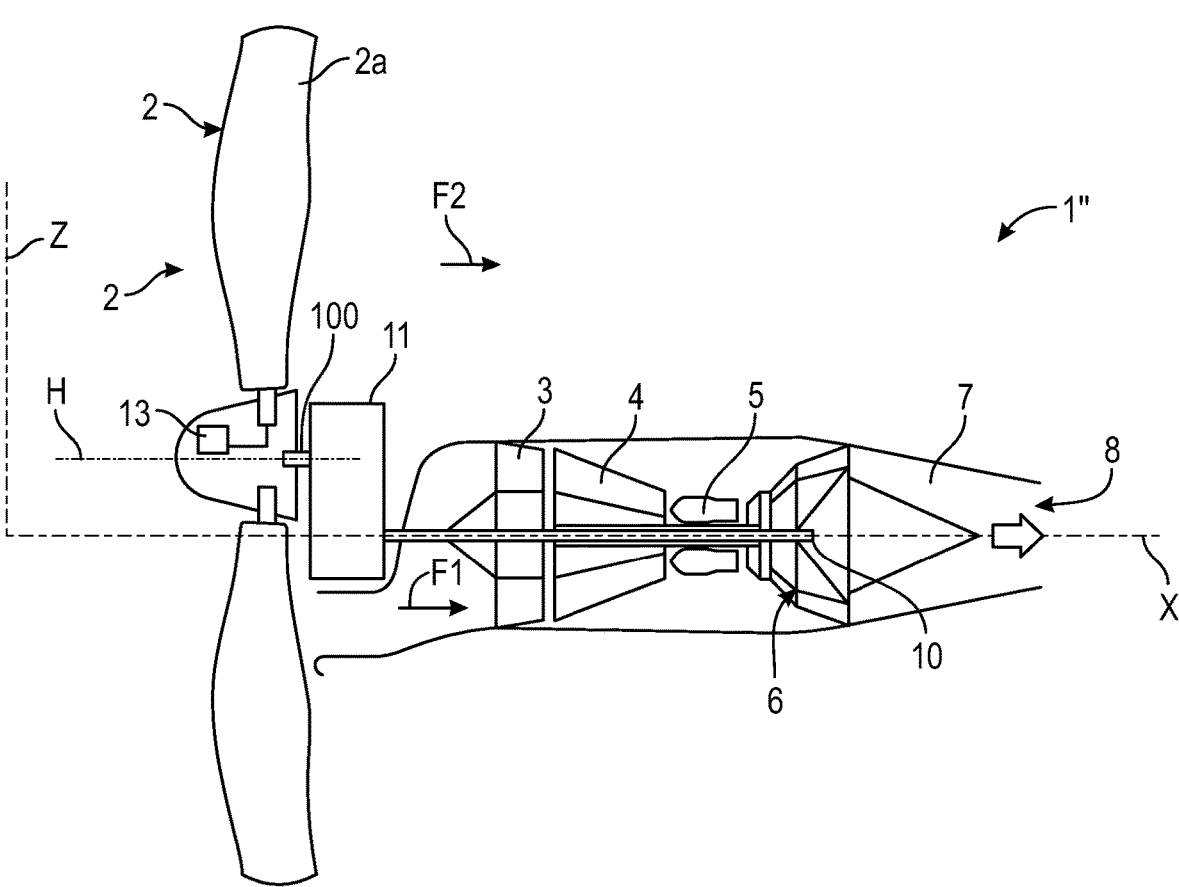
FIG. 3 is a schematic representation in longitudinal cross-section of an aircraft turbine engine according to a third embodiment of the invention.

A turbine engine 1, 1', 1" for an aircraft is shown, for example, in FIGS. 1 to 3. The turbine engine 1, 1', 1" comprises a first rotor 2 connected to a motor M extending around a longitudinal axis X. The motor M comprises, from upstream to downstream in the direction of flow of a main air flow F along the longitudinal axis X, a compressor such as a low-pressure compressor 3 and a high-pressure compressor 4, a combustion chamber 5, a turbine such as a high-pressure turbine 6 and a low-pressure turbine 7, and a nozzle 8.

The rotor of the high-pressure turbine 6 is connected to the rotor of the high-pressure compressor 4 by a high-pressure shaft 9. The rotor of the low-pressure turbine 7 is connected to the rotor of the low-pressure compressor 3 by a low-pressure shaft 10.

The low-pressure 10 and high-pressure 9 shafts are supported by bearings 12a. The bearings 12a are contained in a lubrication enclosure 12 for their lubrication. For example, an upstream bearing 120a is arranged radially between an upstream end of the low-pressure shaft 10 and an upstream bearing support 120b and a downstream bearing 120a' is arranged downstream of the upstream bearing 120a and radially between the low-pressure shaft 10 and a downstream bearing support 120b'. The lubrication enclosure 12 is annular. The upstream and downstream bearings 120a, 120a' are arranged in the lubrication enclosure 12.

The first rotor 2 is driven in rotation by a rotor shaft 100. The rotor shaft 100 is connected to the low-pressure shaft 10. The low-pressure shaft 10 drives in rotation the rotor shaft 100. Advantageously, the low-pressure shaft 10 is connected to the rotor shaft 100 by a speed reducer 11. This allows the first rotor 2 to be driven at a lower speed than the speed of rotation of the low-pressure shaft 10. The speed reducer 11 is for example arranged in the lubrication enclosure 12 between the upstream bearing 120a and the downstream bearing 120a'.

The main air flow F passes through the turbine engine 1, 1', 1" and divides into a primary air flow F1 which passes through the motor M in a primary duct and a secondary air flow F2 which passes through the first rotor 2 in a secondary duct surrounding the primary duct.

The turbine engine 1, 1', 1" comprises vanes 2a that allow to exert an action on the main air flow F, primary air flow F1 or the secondary air flow F2. For example, the rotors of the low-pressure 3 and high-pressure 4 compressors comprise vanes 2a which allow to compress the primary air flow F1 upstream of the combustion chamber 5.

In general, the vanes 2a can be stationary in rotation about the longitudinal axis X or movable in rotation about the longitudinal axis X or an axis parallel to the longitudinal axis X.

In a first embodiment shown in FIG. 1, the turbine engine 1 is a double flow turbojet engine. In this embodiment, the first rotor 2 is a ducted fan arranged upstream of the motor M. The fan comprises vanes 2a. The vanes 2a of the fan are movable in rotation about the longitudinal axis X. They are carried, for example, by a disk centered on the longitudinal axis X and driven in rotation by the rotor shaft 100. The vanes 2a are arranged inside a fan casing 2b. The casing 2b is surrounded by a nacelle (not shown).

In a second embodiment shown in FIG. 2, the turbine engine 1' is a turbojet engine with an unducted fan. In this embodiment, the first rotor 2 is a fan comprising vanes 2a. According to this embodiment, the fan is arranged downstream of the motor M (not visible in this figure). The fan is movable in rotation about the longitudinal axis X. The vanes 2a of the fan are carried by a disk movable in rotation about the longitudinal axis X. In addition, according to this embodiment, a stator vane 2' is optionally arranged downstream of the fan 2 in order to straighten the secondary air flow F2. The stator vane 2' forms a stationary vane ring about the longitudinal axis X. It comprises vanes 2a, which may have variable pitch. The vanes 2a are mounted on the outside of the nacelle.

In a third embodiment shown in FIG. 3, the turbine engine 1" is a turboprop engine. In this embodiment, the first rotor 2 is a propeller arranged upstream of the motor M. The propeller is movable in rotation about a propeller axis H parallel to the longitudinal axis X and comprises vanes 2a. The vanes 2a are carried by a disk centered on the propeller axis H. The vanes 2a are, for example, at least two in number and evenly distributed over the disk.

The vanes 2a extend radially with respect to the longitudinal axis X. They typically comprise a blade and an element for attaching to the disk. The attachment element is, for example, an attachment root or a platform.

According to the invention, the vanes 2a have a variable pitch angle. By variable pitch angle, it is understood that the vanes 2a are movable in rotation about a transverse axis Z substantially perpendicular or perpendicular to the longitudinal axis X.

In order to control the pitch angle of the vanes 2a, the turbine engine 1, 1', 1" according to the invention comprises a system 13 for controlling the variable pitch angle of the vanes 2a. The control system 13 comprises a control unit 13a and at least one hydraulic actuator 13b supplied with oil. The control unit 13a is, for example, stationary in rotation about the longitudinal axis X. The control unit 13a is connected, for example, to a stator of the turbine engine 1, 1', 1". The control unit 13a is known in the field of the invention by the acronym PCU for "Pitch Control Unit". The hydraulic actuator 13b is, for example, a hydraulic cylinder comprising a rod that is mobile in translation and is connected to the vane 2a, possibly via a transformation mechanism of the movement. The translational movement of the rod allows the vane 2a to rotate around its axis. The translational movement of the movable rod is controlled by the control unit 13a, which supplies oil to the hydraulic actuator 13b. The hydraulic actuator 13b is movable in rotation about the longitudinal axis X or about an axis parallel to the longitudinal axis X. The hydraulic actuator 13b is, for example, secured in rotation to the vanes 2a. The hydraulic actuator 13b, for example, is arranged upstream of the control unit 13a.

Advantageously, the control system 13 comprises a device for transferring oil 13c from the control unit 13a towards the hydraulic actuator 13b. The oil transfer device 13c transfers oil from the control unit 13a which is stationary towards the hydraulic actuator 13b which is movable in rotation. The oil transfer device 13c is known by the acronym OTB for "Oil Transfer Bearing". The oil transfer device 13c is located in the lubrication enclosure 12, for example.

The turbine engine 1, 1', 1" also comprises an electrical control unit 24. The electrical control unit 24 is used to drive the control unit 13a. The electrical control unit 24 is, for example, a FADEC (Full Authority Digital Engine Control).

Figure 4A:
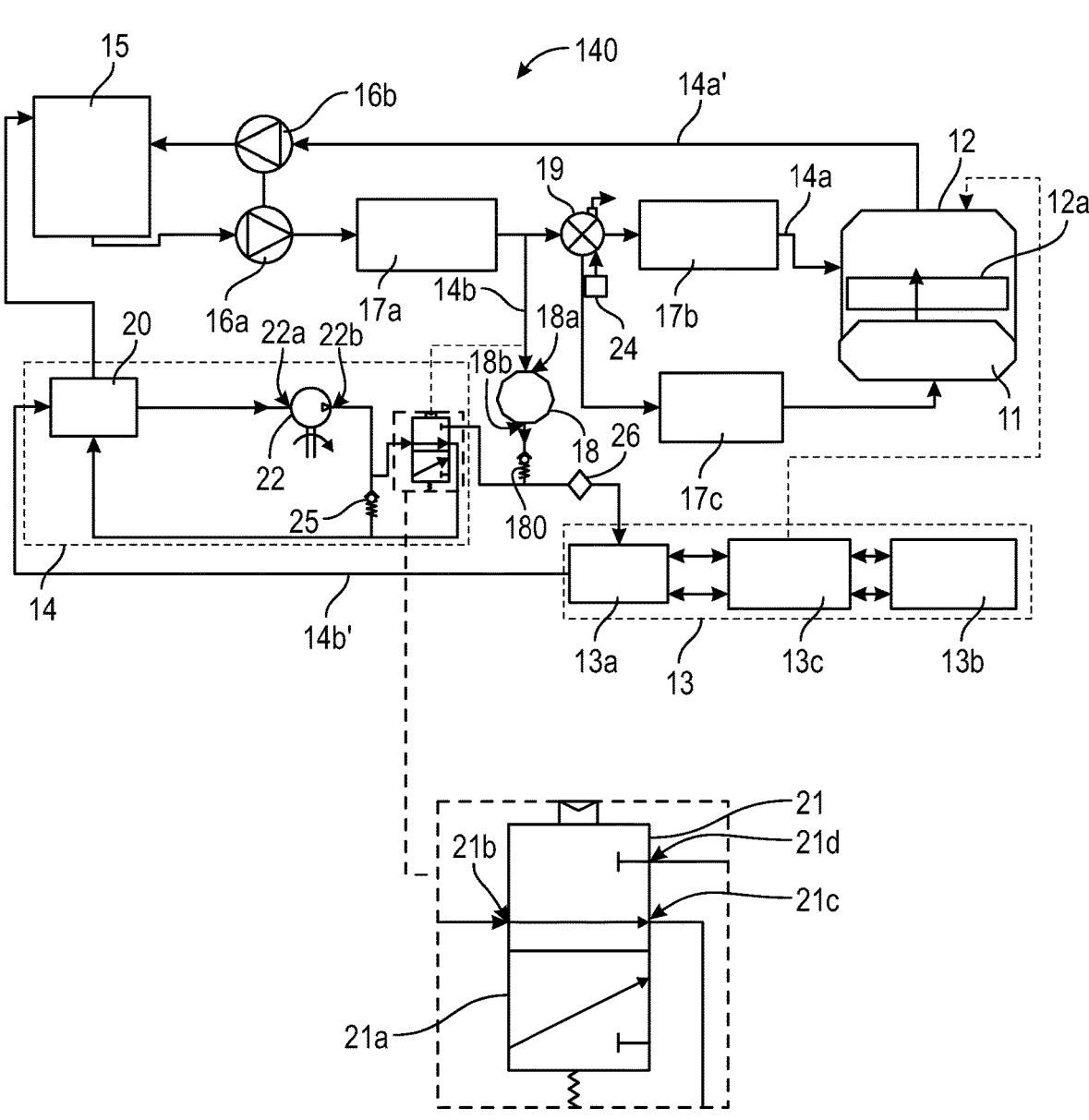
FIG. 4a is a schematic representation of an oil supply system comprising the auxiliary device according to the invention in a first position.
Figure 4B:
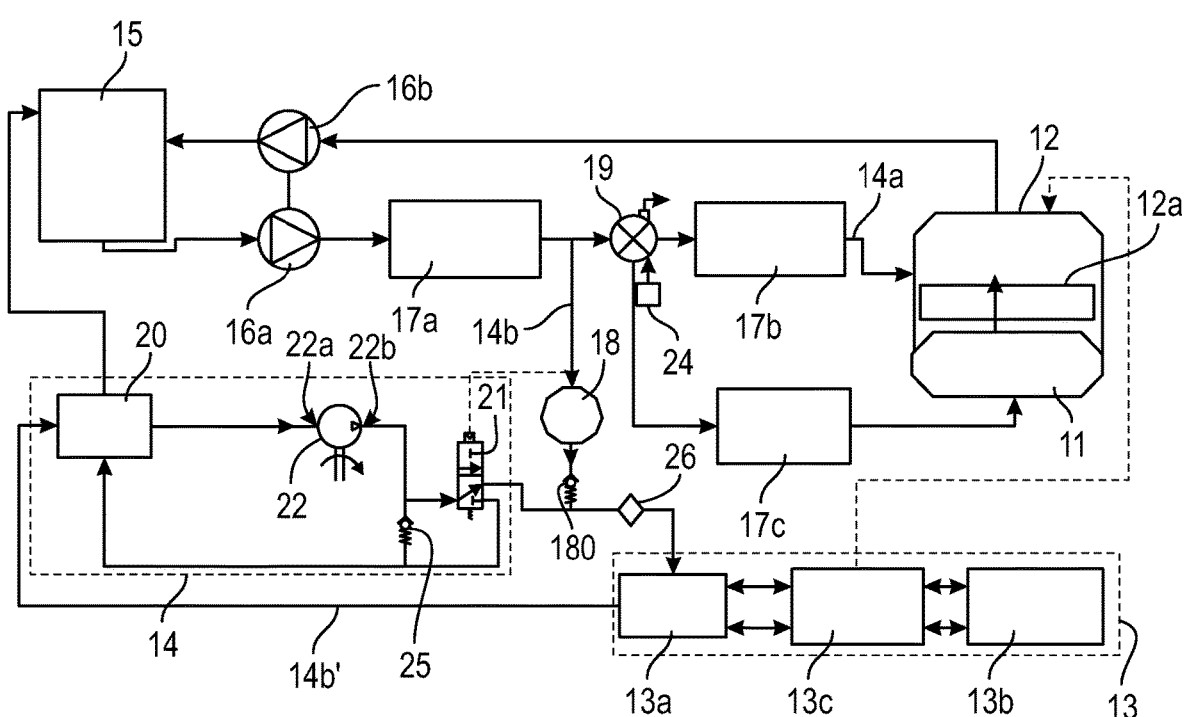
FIG. 4b is a schematic representation of an oil supply system comprising the auxiliary device according to the invention in a second position.

In addition, the turbine engine 1, 1', 1" comprises an oil supply system 140 shown, for example, in FIGS. 4a and 4b. The oil supply system 140 comprises a first supply circuit 14a and a second supply circuit 14b. The first supply circuit 14a supplies oil to the lubrication enclosure 12 for lubricating the bearings 12a and the reducer 11, and the second supply circuit 14b supplies oil to the control system 13. Advantageously, the oil supply system 140 comprises an oil recovery circuit 14a' from the lubrication enclosure 12 and an oil recovery circuit 14b' from the control system 13.

The oil sent to the bearings 12a, for example the upstream bearing 120a and the downstream bearing 120a', to the reducer 11 and the oil leaks from the transfer device 13c, fall back to the bottom of the lubrication enclosure 12. To optimise the oil consumption, this oil is recovered and directed, for example, into the oil recovery circuit 14a' of the lubrication enclosure 12.

According to the invention, the oil supply system 140 also comprises a main oil tank 15 connected to the first supply circuit 14a and to the second supply circuit 14b.

The first supply circuit 14a comprises a first pump 16a allowing oil to be sucked from the main tank 15 and circulated in the first supply circuit 14a. Advantageously, the first supply circuit 14a comprises a first oil/fuel exchanger 17a, and optionally a second oil/fuel exchanger 17b, which are arranged between the first pump 16a and the lubrication enclosure 12.

Advantageously, the oil supply system 140 comprises a distribution valve 19 with two outlets, mounted on the first circuit 14a. The distribution valve 19 is a variable diaphragm valve. The distribution valve 19 is fitted between the first pump 16a and the lubrication enclosure 12. Preferably, the distribution valve 19 is mounted between the first oil/fuel exchanger 17a and the second oil/fuel exchanger 17b. The first outlet of the distribution valve 19 is connected to the lubrication enclosure 12, for example, and the second outlet is connected to the reducer 11.

In addition, according to this example, an air/oil exchanger 17c connects the second outlet of the distribution valve 19 and the reducer 11.

The distribution valve 19, for example, is controlled by the electrical control unit 24.

The oil recovery circuit 14a' of the lubrication enclosure 12 comprises a second pump 16b connected to the lubrication enclosure 12 and to the main tank 15. The second pump 16b allows to suck the oil from the lubrication enclosure 12 and returns it to the main tank 15 via the recovery circuit 14a'.

In addition, according to the invention, the oil supply system 140 comprises an oil supply pump 18 to the control system 13. The supply pump 18, for example, is mounted on the second supply circuit 14b. The supply pump 18 is a hydraulic pump. The supply pump 18 is a positive displacement pump, for example. The positive displacement pump may have a fixed or variable displacement. The supply pump 18 comprises an inlet 18a connected to the main tank 15 and an outlet 18b connected to the control system 13. Advantageously, the supply pump 18 is mounted on the second circuit 14b, and its inlet 18a is connected to the first supply circuit 14a between the first pump 16a and the distribution valve 19. Preferably, the supply pump 18 is mounted between the first oil/fuel exchanger 17a and the distribution valve 19. The second supply circuit 14b may comprise a filter 26 arranged between the supply pump 18 and the control system 13.

During the first phase of operation of the turbine engine 1, 1', 1", the first pump 16a sucks oil from the main tank 15 and conveys the oil in the first supply circuit 14a to the lubrication enclosure 12. The distribution valve 19 distributes the oil downstream of the first pump 16a between the lubrication enclosure 12 and the reducer 11. The supply pump 18 sucks oil from the first supply circuit 14a downstream of the first pump 16a and conveys the oil in the second supply circuit 14b to the control system 13.

During the second phase of operation, typically a flight in negative (or inverted) gravity, the oil is pressed into the upper portion of the main tank 15 while the lower portion connected to the first pump 16a is occupied by air. At zero gravity, an air-oil mixture is suspended in the tank 15. The supply pump 18 is indirectly connected to the lower portion of the main tank 15 since it is connected to the main circuit 14a downstream of the first pump 16a, and is therefore liable to suck in air or oil heavily laden with air bubbles. This is not acceptable because the control system 13 must be supplied with oil that is relatively free of air bubbles, so as not to compromise the operation of the control unit 13a and therefore the hydraulic actuator 13b that controls the pitch of the vanes 2a. The presence of air can also cause the supply pump 18 to stop. Consequently, in order to ensure a suitable oil supply for the control system 13 during the second phase of operation of the turbine engine 1, 1', 1", the invention proposes an auxiliary supply device 14. The auxiliary supply device 14 is mounted on the second supply circuit 14b.

The auxiliary supply device 14 comprises an auxiliary oil tank 20, an auxiliary pump 22 comprising an inlet 22a connected to the auxiliary tank 20 and an outlet 22b. The auxiliary pump 22 is a fixed-displacement hydraulic pump. The auxiliary pump 22 is driven by the low-pressure shaft 10 or the high-pressure shaft 9. Alternatively, the auxiliary pump 22 is driven electrically by an electric motor.

The auxiliary supply device 14 according to the invention also comprises a valve 21.

The valve 21 is a hydraulic valve. The valve 21 is a 3/2-way directional valve, i.e. it has three apertures and two positions. The valve 21 is, for example, a hydraulically-operated spring-return directional valve. The valve 21 has a body 21a with an inlet 21b connected to the outlet 22b of the auxiliary pump 22 and a first outlet 21c connected to the auxiliary tank 20 and a second outlet 21d connected to the control system 13. The second outlet 21d is connected to the second supply circuit 14b between the supply pump 18 and the control system 13 and advantageously between the supply pump 18 and the filter 26.

The valve 21 further comprises a movable member in the body 21a configured to move between a first position in which the inlet 21b of the valve 21 is in fluid communication with the first outlet 21c of the valve 21 and a second position in which the inlet 21b of the valve 21 is in fluid communication with the second outlet 21d of the valve 21. The valve 21 comprises, for example, a return spring allowing the returning of the movable member from the second position towards the first position. In the first position, as shown in FIG. 4a, the auxiliary pump 22 sucks oil from the auxiliary tank 20 and the oil is returned to the auxiliary tank 20. The control circuit 13 is supplied with oil by the supply pump 18, which allows oil to circulate in the second supply circuit 14b from the main tank 15.

In the second position, as shown in FIG. 4b, the auxiliary pump 22 sucks oil from the auxiliary tank 20 and the oil is conveyed to the control system 13.

Thus, when the turbine engine 1, 1', 1" is in the first operating phase, in particular when the aircraft is in a "normal" flight phase, i.e. in a positive g condition, the valve 21 is in the first position. When the turbine engine 1, 1', 1" is in the second operating phase, in particular when the aircraft is in a flight phase in which the gravitational force is zero (called "0 g") or negative (called "negative g"), the valve 21 is in the second position. This allows to ensure the supply of oil to the control system 13 from the auxiliary tank 20 and avoids any interruption in the oil supply to the control system 13 under these conditions.

Preferably, the auxiliary pump 22 remains active whatever the position of the movable member of the valve 21. This allows to eliminate the need for a priming time for the auxiliary pump 22 and ensures a rapid oil supply to the control system 13 during the second operating phase of the turbine engine 1, 1', 1".

The valve 21 comprises a hydraulic actuation chamber connected to the inlet 18a of the supply pump 18. When the pressure at the inlet to the supply pump 18 is below a threshold pressure, i.e. when the turbine engine 1, 1', 1" is in the second operating phase, then the movable member is driven into the second position. This configuration allows to simplify the control of the valve 21. This does not require any special sensor, since it is activated by the variation in pressure at the inlet 18a of the supply pump 18.

Alternatively, the valve 21 is directly sensitive to the gravitational force.

The auxiliary tank 20 is connected to the main tank 15 by a first pipe 201a. This ensures that oil is evacuated from the auxiliary tank 20, particularly during the first phase of operation.

The auxiliary tank 20 is configured to deliver oil during the second operating phase of the turbine engine 1, 1', 1". The auxiliary tank 20 is therefore configured to deliver oil in a 0 g and/or negative g condition.

The auxiliary tank 20 comprises an enclosure 200. The enclosure 200 has a first outlet port 201 connected to the main tank 15 for example by the first pipe 201a, a second outlet port 202 connected to the auxiliary pump 22 by a second pipe 202a, a first inlet port 203 connected to the control system 13 by the oil recovery circuit 14b' of the control system 13 and a second inlet port 206 connected to the valve 21. The enclosure 200 delimits an internal volume of oil. In addition, the auxiliary tank 20 comprises a retention member 204.

Figure 5A:
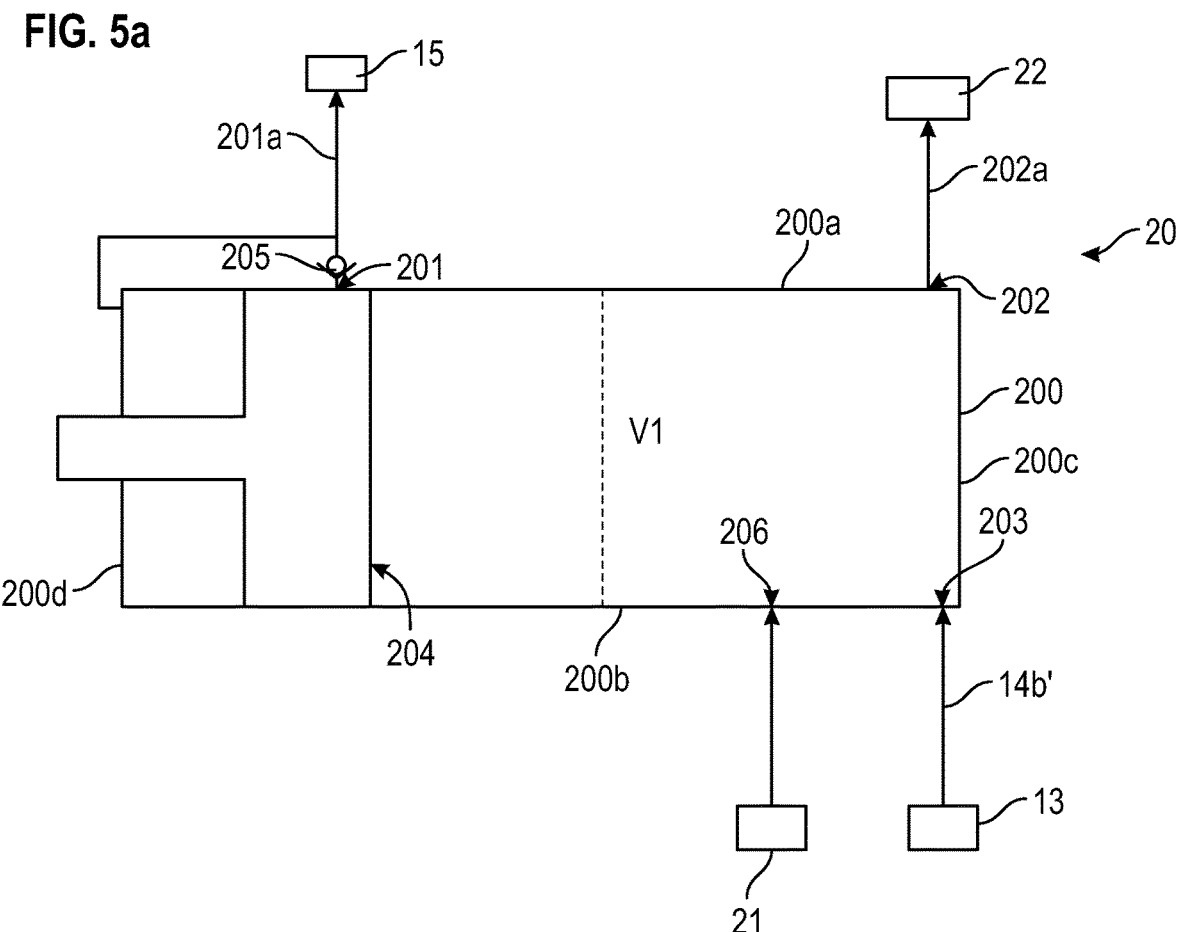
FIG. 5a is a schematic representation of an auxiliary tank according to a first embodiment.
Figure 5B:
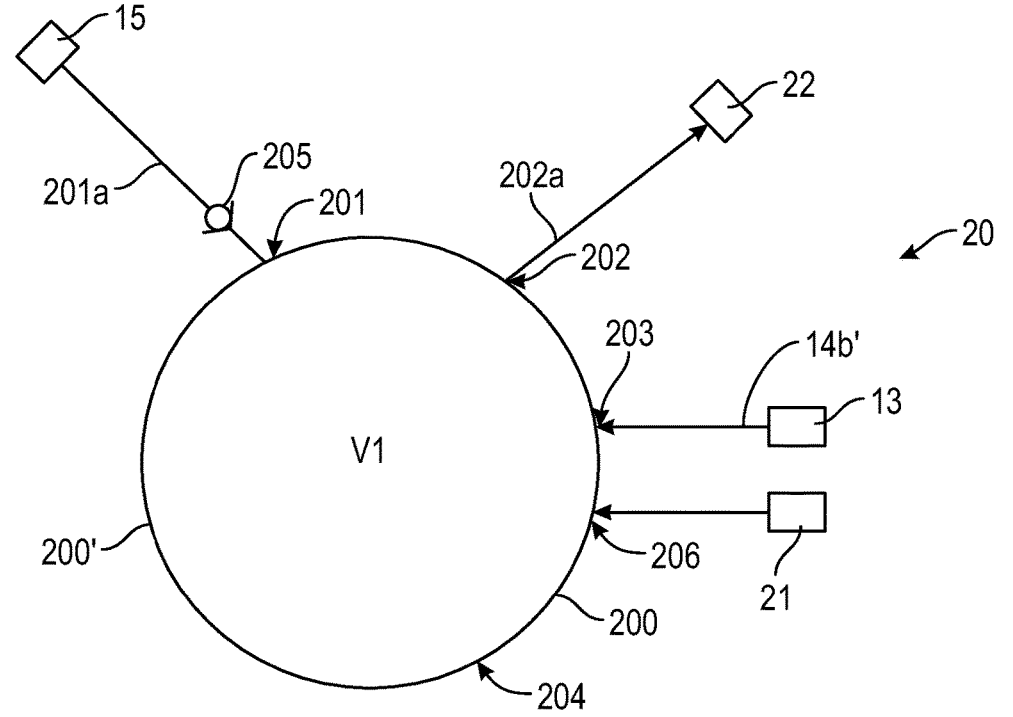
FIG. 5b is a schematic representation of an auxiliary tank according to a second embodiment.

In a first embodiment shown in FIGS. 5a and 5b, the retention member 204 is mobile. It is designed to equalise the volume of oil with the internal volume when the valve 21 is in the second position. The movable retention member 204 defines a variable volume V1 in the internal volume. The variable volume V1 varies between a first volume which is less than or equal to the internal volume and a second volume which is equal to the volume of oil in the auxiliary tank 20. According to this first embodiment, the supply system 14 advantageously comprises a return valve 205 arranged on the first pipe 201a.

According to a first example of embodiment shown in FIG. 5a, the enclosure 200 has two parallel longitudinal walls 200a, 200b connected by two parallel side walls 200c, 200d. The movable retention member 204 comprises a plate which can be moved in translation in the enclosure 200 and extends between the two longitudinal walls 200a, 200b. The movable plate may have faces parallel to the side walls 200c, 200d, and form a piston, for example.

According to a second example of embodiment shown in FIG. 5b, the enclosure 200 is, for example, spherical or oblong. It comprises a wall 200' of circular cross-section. The movable retention wall 204 is formed by the wall 200' of the enclosure 200. It comprises a retractable membrane. The retractable membrane is made of elastomer material, for example.

Figure 5C:
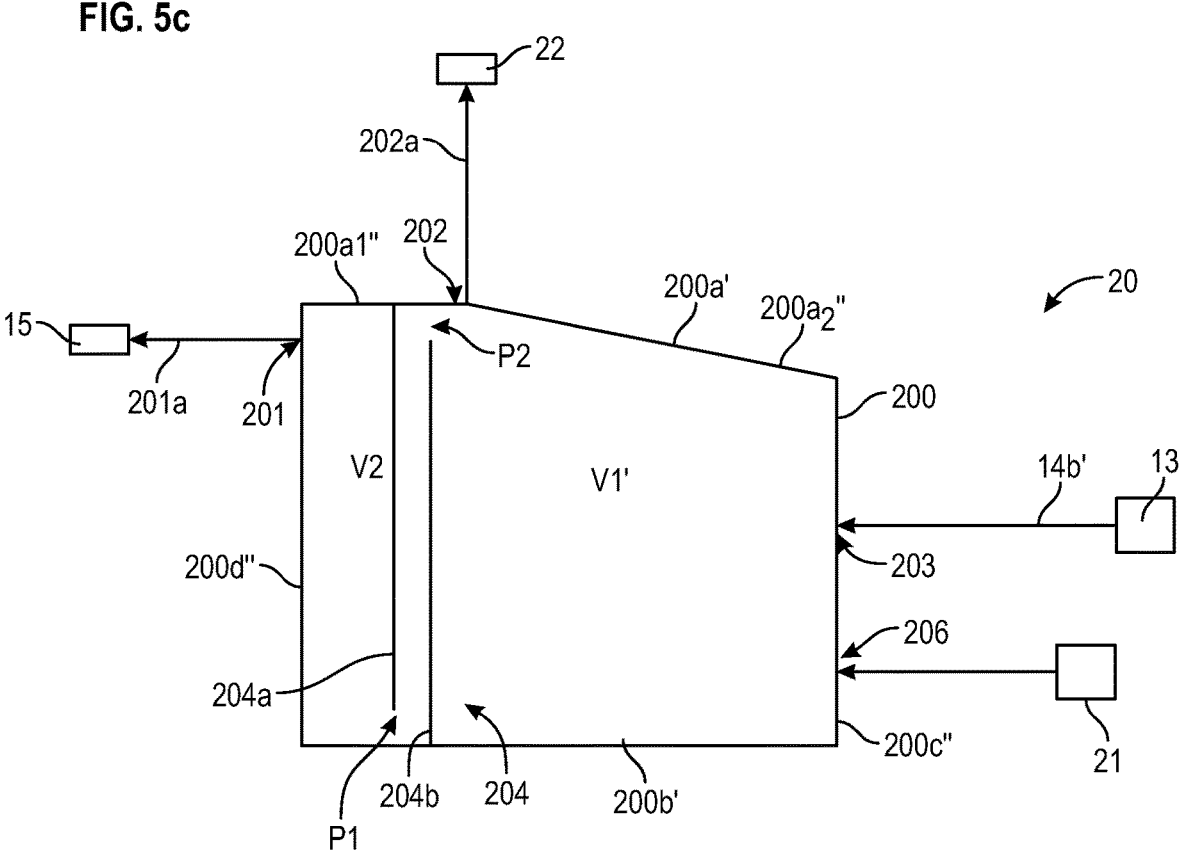
FIG. 5c is a schematic representation of an auxiliary tank in a third embodiment.

In a second embodiment shown in FIG. 5c, the enclosure 200 is polygonal. It comprises an upper wall 200a" and a lower wall 200b" connected by opposing transverse walls 200c", 200d". The transverse walls 200c", 200d" are parallel to each other. The upper wall 200a" comprises, for example, a first segment 200a1" parallel to the lower wall 200b" and a second segment 200a2" inclined towards the inside of the enclosure 200 so as to define with the first segment 200a1" a top oriented towards the outside of the enclosure 200. The first outlet port 201 is formed, for example, on the transverse wall 200d" and the first inlet port 203 is formed, for example, on the opposite transverse wall 200c". The second outlet port 202 is located on the upper wall 200a", for example on the second segment 200a2". The retention member 204 is, for example, a baffle arranged in the enclosure 200. The baffle comprises a first end wall 204a extending from the upper wall 200a" towards the lower wall 200b" and a second end wall 204b extending from the lower wall 200b" towards the upper wall 200a", the first end wall 204a and the lower wall 200b" defining a first fluid passage P1, and the second end wall 204b and the upper wall 200a" defining a second fluid passage P2. The first and second end walls 204a, 204b are parallel to the transverse walls 200c", 200d". The baffle separates a supply volume V1' and an adjustment volume V2. The supply volume V1' is in fluid communication with the second outlet port 202 and the adjustment volume V2 is in fluid communication with the first outlet port 201.

The auxiliary tank 20 is configured to communicate oil to the second outlet port 202 continuously in the first and second operating phases of the turbine engine 1, 1', 1". In the first embodiment of the auxiliary tank 20, when the valve 21 is in the second position, the movable retention wall 204 moves so that the variable volume V1 is equal to the volume of oil in the enclosure 200. The movable retention wall 204 also closes off the first outlet port 201. In this way, the oil contained in the first internal volume V1 communicates with the second outlet port 202. The auxiliary pump 22 then sucks in oil 22 free of air bubbles, even in a 0 g or negative g condition.

In the second embodiment of the auxiliary tank 20, the baffle allows to increase the delay allowing the air, present in the adjustment volume V2 on entering the enclosure 200 via the first outlet port 201, to reach the supply volume V1, so that the second aperture 202 is only in contact with oil during the second phase of operation of the turbine engine 1, 1', 1", therefore even in a 0 g or negative g condition. The auxiliary pump 22 then sucks in oil 22 free of air bubbles, even in a 0 g or negative g condition.

Advantageously, the auxiliary supply device 14 also comprises a pressure limiter 25 arranged at the outlet of the auxiliary pump 22, between the auxiliary pump 22 and the valve 21. The pressure limiter 25 is a non-return valve, for example.

According to a preferred embodiment of the invention, the supply pump 18 comprises a non-return valve 180 so that all the oil delivered by the auxiliary pump 22 supplies the control system 13.

A method for supplying oil to the turbine engine 1, 1', 1" will now be described.

Figure 6:
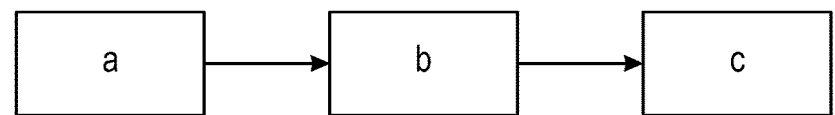
FIG. 6 is a block diagram of the method according to the invention.

The method is illustrated in FIG. 6, for example.

The method comprises the following steps:

(a) during a first operating state of the turbine engine 1, 1, 1, supplying oil to the control system 13 from the main tank 15, the valve 21 being in a nominal operating state in which the movable member is in the first position, (b) detecting a second operating state of the turbine engine 1, 1', 1", (c) operating the valve 21 to move the member from the first position to the second position to supply oil to the control system from the auxiliary tank 20.

During steps (a), (b) and (c), the auxiliary pump 22 continuously sucks oil from the auxiliary tank 20.

Thanks to the device described in the invention, it is possible to ensure that the control system 13 is supplied during all phases of operation of the turbine engine 1, 1', 1" and in particular during phases of flight of the aircraft in 0 g or negative g conditions. The device of the invention allows the control system 13 to be supplied by the auxiliary pump 22 and the valve 21. The control of the valve 21 also does not require a specific sensor such as an accelerometer. Advantageously, this comprises a hydraulic actuation chamber directly connected to the inlet 18a of the supply pump 18. A drop in pressure at the inlet 18a of the pump 18, reflecting a flight condition of 0 g or negative g, drives the movable member into the second position.

The invention claimed is:

1. An auxiliary device for supplying oil to a control system for controlling variable pitch angle vanes for an aircraft turbine engine, the control system being supplied with the oil from a main oil tank under conditions of positive gravitational force experienced by the aircraft, the auxiliary device being intended to supply the oil to the control system under conditions of negative or zero gravitational force experienced by the aircraft, the auxiliary device comprising:

an auxiliary oil tank, an auxiliary pump comprising an inlet connected to the auxiliary tank and an outlet, a valve comprising a body having an inlet connected to the outlet of the auxiliary pump and a first outlet connected to the auxiliary tank, and a second outlet intended to be connected to the control system, the valve further comprising a movable member movable in the body and configured to move between a first position in which the inlet of the valve is in fluid communication with the first outlet of the valve and a second position in which the inlet of the valve is in fluid communication with the second outlet of the valve.

2. The auxiliary device as claimed in claim 1, wherein the auxiliary pump is a fixed-displacement hydraulic pump.

3. The auxiliary device according to claim 1, wherein the valve comprises a hydraulic actuation chamber.

4. The auxiliary device according to claim 1, wherein it comprises a rotary motor for driving the auxiliary pump.

5. The auxiliary device according to claim 1, wherein it comprises a pressure limiter arranged between the auxiliary pump and the valve.

6. An aircraft turbine engine comprising:

the variable pitch angle vanes, the control system for controlling the vanes comprising:

a control unit connected to a hydraulic actuator, an oil supply system comprising:

a main oil tank, an oil supply pump comprising an inlet connected to the main oil tank and an outlet connected to the control system, wherein it further comprises the auxiliary oil supply device according to any one of the preceding claims.

7. The aircraft turbine engine according to claim 6, wherein the oil supply system comprises:

a second oil supply circuit connecting the main tank to the control system, and on which the supply pump is mounted, the valve being mounted on said second supply circuit between the supply pump and the control system, and an oil recovery circuit connecting the control system to the auxiliary tank.

8. The aircraft turbine engine according to claim 6, wherein the valve comprises a hydraulic actuation chamber; and wherein the movable member is configured to move towards the second position when the pressure at the inlet of the supply pump is less than a threshold pressure.

9. The aircraft turbine engine according to claim 6, wherein the auxiliary tank comprises an enclosure delimiting a first internal volume of the oil and having at least a first outlet port connected to the main tank, a second outlet port connected to the auxiliary pump, a first inlet port connected to the control system, and a second inlet port connected to the valve, the auxiliary tank further comprising a movable retention wall able to equalize a volume of the oil to the internal volume when the valve is in the second position.

10. The aircraft turbine engine according to claim 9, wherein the movable retention wall is formed by the enclosure and comprises a retractable membrane formed by a wall of the enclosure.

11. The aircraft turbine engine as claimed in claim 9, wherein the movable retention wall comprises a plate that is movable in translation in the enclosure, extending between two side walls of the enclosure.

12. A method for supplying the oil to an aircraft turbine engine according to claim 6, comprising the following steps:

(a) during a first operating state of the turbine engine, supplying the oil to the control system from the main tank, the valve being in a nominal operating state in which the movable member is in the first position, (b) detecting a second operating state of the turbine engine, (c) actuating the valve to move the movable member from the first position to the second position to supply the oil to the control system from the auxiliary tank.

\*   \*   \*   \*   \*